(12) United States Patent
Treherne, Jr.

(10) Patent No.: US 10,596,639 B1
(45) Date of Patent: Mar. 24, 2020

(54) PRECISION DRILLING PLATFORM

(71) Applicant: Tyrone S. Treherne, Jr., Wallingford, PA (US)

(72) Inventor: Tyrone S. Treherne, Jr., Wallingford, PA (US)

( * ) Notice: Subject to any disclaimer, the term of this patent is extended or adjusted under 35 U.S.C. 154(b) by 370 days.

(21) Appl. No.: 13/999,603

(22) Filed: Mar. 12, 2014

Related U.S. Application Data

(60) Provisional application No. 61/851,761, filed on Mar. 13, 2013.

(51) Int. Cl.
| | | |
|---|---|---|
| *B32B 39/00* | (2006.01) | |
| *E21B 7/04* | (2006.01) | |
| *E21B 15/04* | (2006.01) | |
| *B23B 39/00* | (2006.01) | |

(52) U.S. Cl.
CPC .............. *B23B 39/00* (2013.01); *E21B 7/046* (2013.01); *E21B 15/04* (2013.01); *Y10T 408/55* (2015.01); *Y10T 408/5612* (2015.01); *Y10T 408/6764* (2015.01); *Y10T 408/6793* (2015.01); *Y10T 408/91* (2015.01)

(58) Field of Classification Search
CPC ......... B23B 39/00; E21B 7/046; E21B 15/04; Y10T 408/55; Y10T 408/5612; Y10T 408/56275; Y10T 408/6764; Y10T 408/6793; Y10T 408/91; Y10S 408/705
See application file for complete search history.

(56) References Cited

U.S. PATENT DOCUMENTS

| | | | | |
|---|---|---|---|---|
| 681,375 | A * | 8/1901 | Reed | B23B 47/28 408/72 R |
| 1,417,278 | A * | 5/1922 | Peters | B23Q 9/00 408/102 |
| 1,748,556 | A * | 2/1930 | McKnight | B23B 39/168 144/106 |
| 2,992,570 | A * | 7/1961 | Raine | B23B 41/00 408/237 |
| 3,071,988 | A * | 1/1963 | Gibson | B23Q 1/01 269/219 |
| 3,751,175 | A * | 8/1973 | Brooks | B23B 41/12 408/72 R |
| 4,213,721 | A * | 7/1980 | Aldridge, Jr. | B23B 41/12 269/73 |
| 4,533,284 | A * | 8/1985 | Agius | B25H 1/0064 408/111 |
| 4,856,945 | A * | 8/1989 | Bareis | B23B 29/02 408/234 |

(Continued)

*Primary Examiner* — Eric A. Gates
(74) *Attorney, Agent, or Firm* — Robert B. Famiglio; Famiglio & Associates

(57) ABSTRACT

A method and apparatus for controlling lateral drilling for accurate placement of laterally running conduit for electrical, fluid or gas piping. The disclosure provides a stable platform which is adjustable and may be quickly assembled in a basement or subterranean building area to allow accurate placement of lateral deep drilling to provide connection between a below grade space, through a foundation wall and through soil to place the termination point of the desired hole very close to a target location. The apparatus can be driven with an internal drill or a hand drill to drive a screw-like mechanism forward once the geometry of the intended conduit drilling is set up.

1 Claim, 2 Drawing Sheets

(56) References Cited

U.S. PATENT DOCUMENTS

| | | | | |
|---|---|---|---|---|
| 5,885,037 A | * | 3/1999 | Heintzeman | ......... B23Q 9/0085 |
| | | | | 408/1 R |
| 7,771,145 B2 | * | 8/2010 | Katoh | ...................... B23B 41/02 |
| | | | | 408/1 R |
| 7,954,681 B2 | * | 6/2011 | Smith | ...................... B27F 7/006 |
| | | | | 227/107 |

* cited by examiner

PRECISION DRILLING PLATFORM

CROSS REFERENCE TO RELATED APPLICATIONS

The Applicants claim the benefit of the provisional patent application No. 61/851,761 filed on Mar. 13, 2013.

BACKGROUND OF THE INVENTION

1. Field of the Invention

The present invention relates to platforms from which to drill laterally from an excavation pit or basement wall to allow accurate targeting of conduit placement from a subterranean location to a targeted point outside the starting location or structure such as would be used to place utility lines underground.

2. Description of the Related Art

The need to drill accurate holes through basement foundation walls in order to intercept a predetermined location outside of a structure has been long known. For many years, utility companies and contractors attempting to place underground electrical, communications, fuel gas or other plumbing piping have experienced a need to be as accurate as possible in drilling a hole to place new conduit or other piping from inside a building to an outside location below the surface to connect to existing utility structures or other locations. Many times this is done manually by digging a ditch and can be inaccurate and labor intensive.

Drilling long slender holes through foundations to run electric or telephone cables below grade, for example, are sometimes performed by drilling through the outside of a basement structure to a pit dug outside the building and additional diggings are undertaken to provide a trench to terminate the new conduit or other connection at a predetermined connection point at a street. Such methods are labor intensive and causes more damage to the outside of the structure such as to landscaping or other paving as might be necessary than if a single hole can be drilled without needing to have an intermediate working location on the surface to intersect the intended route of the conduit or piping.

While it may be possible to locate a reasonably accurate point in the inside foundation of a building in order to drill and to exit that building at a known location immediately adjacent outside of the foundation, it is more desirable to have an accurate and stable platform in which to drive extended drill bits not only through the foundation or other structure but to continue the drilling without intermediate readjustment processes so that the terminus of the drill may end up very close or identical to the point desired many feet past the foundation of the building being drilled.

For example, it is desirable to continue drilling 20 or 30 feet through a foundation wall to end up at a predetermined location very close to or identical to the desired termination point of a utility line or termination without needing to dig trenches or change direction to correct for slight errors that are inherent in this type of subterranean utility work.

It would be desirable to have a stable and adjustable drilling platform which can be carried into and assembled within a foundation or excavation pit in which there may be tight quarters but which can still be accurately deployed and adjusted. It is also desirable to have a platform for a drill which allows accurate incrementation of horizontal and vertical angles as well as elevation such as to calculate the geometry, using trigonometry, to accurately drill a hole laterally to a target location which is within several inches of the desired location 20 feet away or greater. The platform must be simple to assemble, low cost and stable while allowing for height and drill bit departure angles to be accurately set and maintained during use.

SUMMARY OF THE INVENTION

The disclosed invention provides an easy to construct and assemble drilling platform which consists of at least two contact points to the floor or surface on which it will be constructed such as to create a stable plane. In a preferred embodiment there are four legs extending from a table-like frame apparatus in which the legs terminate in a forward and rear plate assembly allowing for stable and accurate leveling on a rough surface. A drilling motor and bit assembly are attached to the platform. The drilling platform and assembly provide for a threaded drill driving device which allows the operator to advance the platform's drilling apparatus forward or backwards using a conventional hand drill or a built-in drill carriage driving motor to allow forward and rear operation at speeds conducive to the type of structure and soil being drilled.

A table-like drilling platform provides adjustment means to level or otherwise adjust the pitch, height and take-off angle of the drill driving carriage so that long extended drill bits can be accurately directed and remain stable after drilling through a structure's foundation or other subterranean area such that accurate placement of the tip of the drill can be assured. The device allows for use of extended drill rods that attach through each sequential cycle of driving a drill bit forward so that drill bit sections can be added to each other sequentially to obtain long distance drilling in a straight and calculated direction.

The object of the present invention is to provide a portable precision drilling platform, in one embodiment, being comprised of a portable carriage assembly including a first drill motor and a drill motor base. A drill carriage assembly is operatively connected to an operating surface which is driven in at least one dimension laterally. The drill carriage assembly is driven by connection to a carriage drive rod, itself driven by a second drive motor attached to the rod. Further, a top table-like surface is supported in at least two points with those points defining a line parallel to the fore and aft direction of travel of the drill carriage assembly. The at least two support points are length adjustable and articulate about any angle necessary to allow aligning the platform in a plane in a direction calculated by the operator. The drilling platform can be designed with one articulating hinge on each leg which supports the table-like top platform but may be adjusted to account for angles of each leg either at each leg's intersection with the table or the resting surface or in a simpler form, having only a single leg adjustment for the extendable legs which support the table-like platform in which the drilling assembly rests. The preferred embodiment provides for articulating joints at each end of the supporting legs. An alternate embodiment allows for attachment directly to a vertical surface through which drilling is intended.

The invention can further include an extendable drill bit apparatus which is operatively connected to the main drill motor which facilitates a drilling action by the drill bit and extendable drill bit shafts to allow deep hole drilling in sequential operations by advancing the drill carriage assembly each time the drill bit is extended further into the medium in which a hole is being drilled. Such drill shafts can be in convenient lengths of a few feet or as much as ten feet or more in each section depending on how much working room there may be in the area in which the drilling platform is assembled. Extendable shafts are threaded to each other to allow connection sequentially thereby allowing advancement of the drill bit as much as forty or fifty feet past the beginning point without the need to withdraw the drill bit to connect a longer shaft extension to it.

In its basic embodiment, the present invention provides a framework to support a drilling motor and drilling motor drive mechanism to allow the motor to move backward and forward in the plane of the framework along at least one dimension relative to that framework. The drive mechanism is a motor support and transport carriage which rides on at least one rail which guides the support mechanism or carriage in the forward or aft direction by use of a second motor drive mechanism such as a portable drill or other simple electric motor.

The framework is supported at least at two points and preferably three or four points where each support is either supported by one or more surfaces on which the framework rests, or is resting on such said surfaces through at least one or more support legs, each of which are adjustable to allow the legs to be extended or contracted. Further, each leg has at least one joint which allows movement of a support leg or other support point, such as to change the angle of the plane of the framework up or down such as to provide a drilling angle at a desired angle relative to the support surface on which the framework rests.

Beginning at a point in relative space from a starting location, and knowing the desired end location for the boring of a hole laterally through the earth and/or support or foundation walls, using basic trigonometry and with full appreciation of the geometry of the location in which the drilling is occurring, the penetration depth, elevation or height, a simple calculation can be made. Then the take off angle from the starting point can be calculated so that the desired end point some distance away will be reached within inches of the calculated point of termination. A simple reference to the starting point in terms of radius and angle as coordinates or using Cartesian coordinates on an X, Y and Z axis can all be used to calculate the departure direction and elevation from the starting point of the drilling to the desired location outside the location, such as near a water main, gas main, or power conduit, can be easily calculated in terms of starting and ending point.

DETAILED DESCRIPTION OF THE INVENTION

Figure 1:
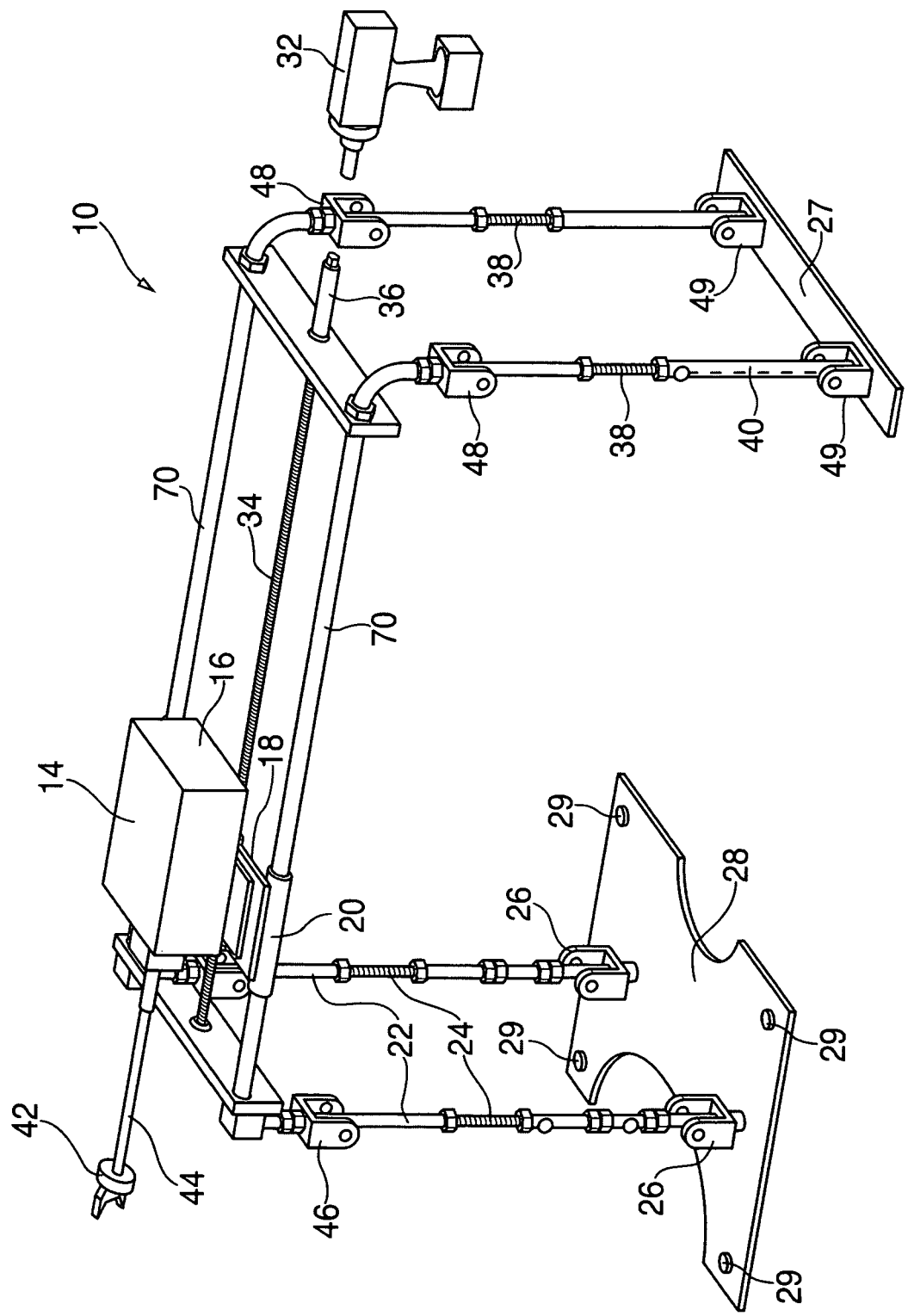
FIG. 1 is a perspective view of the entire drilling platform.

The invention will now be described with reference to the various figures wherein like numbers refer to like parts. Turning now to FIG. 1, a perspective view of the invention is presented illustrating one embodiment of the platform. Specific details of the adjustment angles of the platform are shown in plan view in FIG. 2 and FIG. 3 and will be explained in more detail below. It can be appreciated from the perspective view in FIG. 1 how the platform is a table-like system placed or affixed to a support surface with legs as in the displayed embodiment. The legs themselves are comprised of narrow, tubular, adjustable components and may also be attached to front platform leg base plate 28 and a rear platform leg base plate 27 which allows for stabilization of the platform on irregular or rough surfaces such as would be found in a basement or a foundation floor or other subterranean building structure. Heavy industrial rubber or vinyl machine pads or rests may be placed under the base plates to dampen vibration and to prevent the table from moving if not affixed to the surface. FIG. 1 allows for an appreciation of the drill motor base guide rail 70 used to secure and move the drill motor base 18 and the positioning of drill carriage drive rod 34 explained in more detail below. In the preferred embodiment, there are two guide rail 70 as shown in FIG. 1. The twin rail design provides for smoother transport of the carriage assembly 14 and less binding of rail coupler 20 as the carriage is driven forward and rearward under load.

Figure 2:
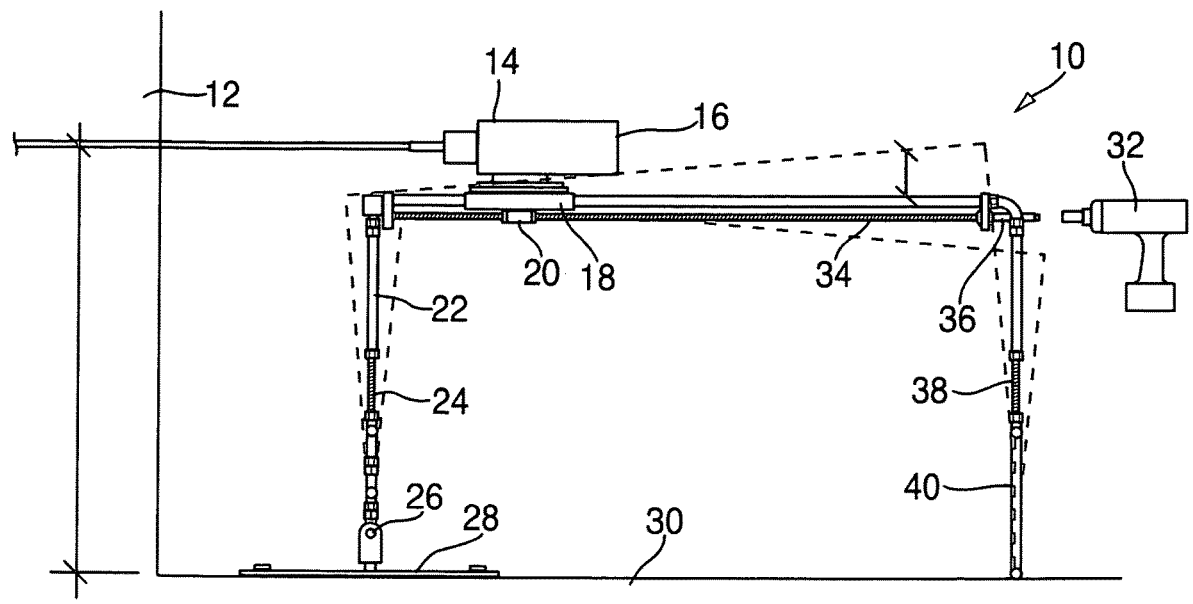
FIG. 2 is a side view of the drilling platform illustrating the available angular adjustments.

Drill platform 10 is shown in FIG. 2 by side plan view. In the embodiment illustrated in FIG. 2, the platform is configured to drill through basement wall face 12 outwardly from platform 10 as drill bit 42 is advanced away from platform 10. Drill carriage assembly 14 is comprised of main drill motor 16 and main drill motor base 18 as shown in FIG. 2. Carriage assembly 14 is driven laterally by drill carriage drive rod 34 and is supported by drill motor base rail coupler 20 as shown. Rail coupler 20 slides over drill motor base guide rail 70. Drive rod 34 is threaded and the screw action displaces carriage assembly 14 toward and away from wall face 12 when driven by drill carriage drive motor 32 as shown. Drive motor 32 can be a handheld drill as depicted in the figures or can be a permanently affixed motor used to rotate drive rod 34 in an appropriate direction and at appropriate speed to advance the drill carriage assembly 14 as stated. Portable drills allow for a more flexible assembly of platform 10 when transporting and then constructing the invention on site where it may be used.

Drill platform 10 is placed on platform resting surface 30, which might be a basement floor or the bottom of an excavated pit from which it is desired to drive drill bit 42 through wall face 12 or any earth below the grade of a given structure outwardly at a subterranean level to a point predetermined outside a basement or foundation wall. Platform 10 can be placed at a desired location by assembling the components of platform 10 providing a stable three or four point contact with surface 30 so that the platform can be provided with stability on a defined plane. Though the invention will function with the equivalent of two legs, a more stable configuration of four legs as shown allows for greater accuracy. The legs may be fixed together at the forward and rearward location as depicted in the figures. However, it should be appreciated that for very rough surfaces 30, each leg may rest alone to provide for the most flexibility in adjusting platform 10.

As shown in FIG. 2, platform leg extensions 22 serve as the front footing for the platform and is height adjustable through height adjustment 24. Lower front leg articulating joint 26 allows for an uneven surface 30 as might be encountered in basements or concrete floors or structures which may not be entirely flat or level. Upper articulating joint 46 operatively connected with the front leg extensions 22 allow articulation of the platform at the upper level as well as the front leg lower articulating joint 26 at the lower level next to base plates 28. In a similar fashion, the upper articulating joint 48 allows adjustment of rear leg pitch angle 54 to accommodate a variety of uneven surfaces 30 and provides maximum flexibility in placing drill platform 10 at different platform pitch angles 52 as may be desired in any particular application. Platform leg base plate 28 as shown in FIG. 2 rests against platform resting surface 30 and may be affixed to surface 30 using bolts 29 driven into base plate 28 as shown.

Drill bit drive attachment 36 allows convenient transition from threaded drive rod 34 to a fixture which will allow attachment to drive motor 32 whether a handheld drill as suggested in FIG. 2 or a more permanent drive motor configured in the same location as presented in the typical embodiment shown. Drive attachment 36 allows any conventional drill device to be coupled to drive rod 34 for manipulating the drill carriage assembly 14 forward and rearward when drilling through basement wall face 12. Attachment 36 can be, for example, terminated in a bolt head such that a socket wrench attachment for drive motor 32 can be used to drive carriage assembly 14 if a portable drill is used as shown in the various figures.

Rear height adjustment rod 38 allows the height to be adjusted as can be appreciated by considering the figures so that drill carriage assembly 14 is vertically located at the desired point to begin lateral drilling through wall face 12. Height adjustment rod 38 is attached to a conventional pipe frame construction which may be braced for stability if desired. Drill bit shaft 44 drives drill bit 42 through basement wall face 12 in increments of several feet or more during one drilling session. As may be appreciated, as drill carriage assembly 14 is advanced from the rear position of platform 10 to the forward position closest to wall face 12, if drill bit 42 has not been driven far enough laterally to reach a desired point, drill bit shaft 44 is disconnected from the main drive motor 16 and the drill carriage assembly 14 is retracted to a starting position at the end of the platform closest to drive motor 32. At this point, additional drill bit extension shaft 44 can be attached through a threading process to allow advancement of bit 42 in increments equal to the length of the new attached bit shaft 44 until a length of 20 or perhaps 30 feet can be achieved in most instances. One advantage of the present invention is the drilling accuracy obtainable with platform 10.

Figure 3:
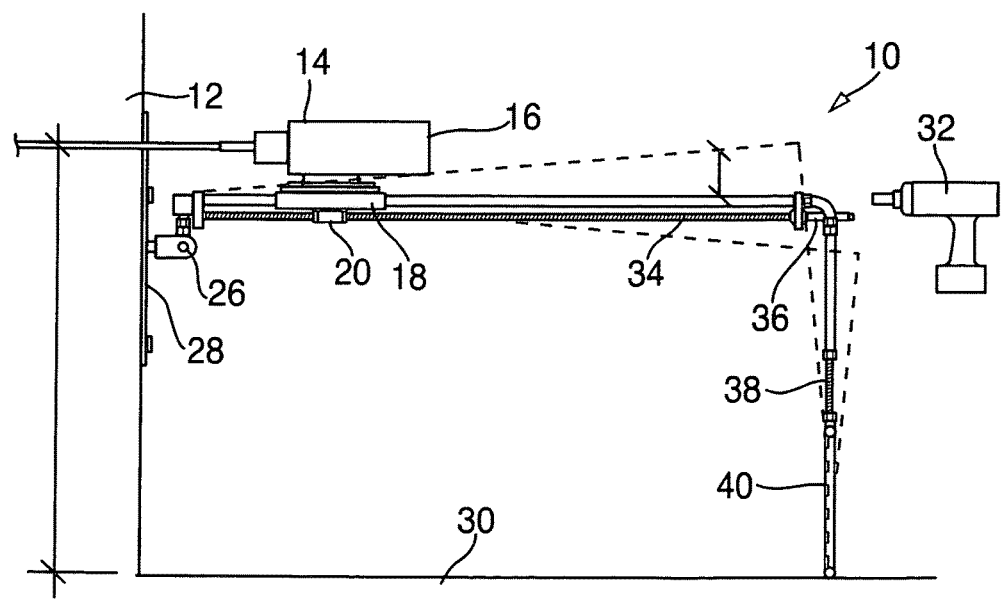
FIG. 3 is a side view of an alternate embodiment of the present invention depicting attachment to a wall on the drilling end of the invention and illustrating the available angular adjustment.

Turning to FIG. 3, an alternate embodiment of drill platform 10 is shown. The theory of operation is similar to the embodiment shown in FIG. 2 except that it would be appreciated that front leg lower articulating joint 26 and platform leg base plate 28 are attached directly to wall face 12 as shown without the need for leg extensions. With this alternate embodiment, it is possible to overcome an unusually uneven surface 30 as might be found in tight quarters or with rough, unfinished floors on which platform 10 may be placed. The configuration shown in FIG. 3 also has the advantage of restricting rearward movement of platform 10 in the event drill 42 contacts materials which are difficult to drill and may cause shaft 44 to apply the reactive force to drill carriage assembly 14 which otherwise may be sufficient to move the platform rearward. The embodiment shown in FIG. 2 is affixed to surface 30 base plate bolts 29, as is base plate 28 affixed to wall face 12 in FIG. 3. The theory of operation shown in FIG. 2 and FIG. 3 is similar, however, as will be appreciated by a comparison of the figures.

Main drill motor 16 drives drill bit shaft 44 which can be of varying length sections or threaded sections to allow sequential connections. Shaft 44 ultimately connects to and drives drill bit 42 as shown in FIG. 2 and FIG. 3. Drill shaft 44 is situated above platform resting surface 30 by drill bit elevation 50 as shown in the various figures. Drill bit elevation 50 can be adjusted by forward height adjustment 24 and rear height adjustment 38 as shown in the figures and as can be appreciated by the geometry shown in entire drill platform 10.

The essence of the invention provides for the advantage of preselecting not only the height or drill bit elevation 50 as shown, but the angle of entry of basement wall face 12 by drill bit 42 can be adjusted in advance by the various adjustments available to platform 10 through the leg height and angle adjustments as illustrated and as will be further described herein.

Platform pitch angle 52 allows the entry of drill bit 42 into and through wall face 12 to be precisely adjusted through the raising and/or lowering of platform front leg extensions 22 or rear platform leg 40. Front leg pitch angle 56 is created by adjustment of the various articulating joints as can be seen in FIG. 2. It can be appreciated by considering the various figures that front leg upper articulating joint 46 and front lower leg articulating joint 26, as well as rear leg upper articulating joint 48 and rear lower leg articulating joint 49, allow substantial adjustment range of the platform. The upper and lower joints as described, main drill motor base 18 and therefore the entire drill carriage assembly 14 can be adjusted with pitch up or pitch down represented by platform pitch angle 52 so that height of drill bit shaft 44 as well as the angle of entry of wall face 12 can be totally under the control of the operator and adjusted such that the geometry of the entire drilling process can be accurately and positively controlled. The articulating joints 26, 46, 48, and 49 each allow rotation about the joint and can be tightened with conventional hardware with a socket wrench or other means to lock down the adjusted angle and dimensions desired once platform 10 is set up at the desired operating location.

The upper and lower articulating joints 26, 46, 48, and 49 as shown in the embodiment of FIGS. 1 and 2 allows articulation or movement in the plane of operation of platform 10. It can be appreciated, and is further contemplated by the present invention that each of the said joints can be a ball joint which allows lockable articulation and freedom of movement in more than one dimension of rotation. Such ball joints are well known and can be substituted at each location where adjustments are desired to allow drill platform 10 to be adjusted in a wider range of environmental circumstances where surface 30 is uneven and unlevel. In the same way, it is possible to operate the present invention by simplifying the range of motion of platform front leg extensions 22 or rear platform legs 40 by providing only one articulating joint. There is a small amount of freedom of movement in the pipe structures used to create platform 10 in the embodiments presented. The invention will perform satisfactorily on flat level surfaces without any moving or adjustable joints but deployment would be limited to such idea conditions. Various ranges of movement and independent adjustment add to the versatility of the platform.

In the preferred embodiment, drill motor base 18 rests upon guide rails 70 which are parallel and generally form the rectangular shape of drill platform 10. Motor base 18 is connected to drill motor base drive coupler 20 which sits generally between the two guide rods 70 as more fully appreciated by the perspective view shown in FIG. 1. However, other forms of carriage support can be utilized and still function as intended. Motor drive base 18 moves forward and rearward as drill carriage drive rod 34 is rotated using carriage drive motor 32 which as described above may be a portable hand drill with the appropriate bit connection or a permanently placed motor which can be controlled as to speed and direction similar to hand drills which function in the same fashion.

Although the invention has been described in accordance with the preferred and alternate embodiments, it will be appreciated by those skilled in the art that the application of the present invention is useful in a variety of configurations and designs not specifically described above. All such designs and applications are considered to be within the scope of the present disclosure, and the invention is applicable across a wide variety of applications.

What is claimed is:

1. An apparatus for precision drilling comprising:
a framework to support a drilling motor and a drive mechanism to move the drilling motor in the plane of the framework along at least one dimension relative to the framework;
said framework including an adjustable support structure which articulates the framework about the plane of the framework relative to the surface upon which the framework is supported, said adjustable support structure further including at least two articulating joints on each of four legs, said legs extending from the framework to the surface upon which the framework rests through said legs, each said leg including an adjustable length such as to allow expansion and contraction of each leg independently of each other leg;
the drilling motor and drive mechanism is operatively connected to a drilling motor housing which advances the housing forward or rearward by rotation of the drive mechanism;
said framework further being adjustable to raise or lower the height of the framework relative the surface upon which the framework rests; and
said drilling motor is attached to and drives a shaft connected to a drill bit for boring through material.

* * * * *